(12) United States Patent
Goodzeit et al.

(10) Patent No.: US 7,051,980 B2
(45) Date of Patent: May 30, 2006

(54) EFFICIENT ORBIT SPARING SYSTEM FOR SPACE VEHICLE CONSTELLATIONS

(75) Inventors: Neil Evan Goodzeit, Princeton, NJ (US); James Donald Lempke, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/374,750

(22) Filed: Feb. 25, 2003

(65) Prior Publication Data

US 2004/0056146 A1 Mar. 25, 2004

Related U.S. Application Data

(60) Provisional application No. 60/359,308, filed on Feb. 26, 2002.

(51) Int. Cl.
*B64G 1/10* (2006.01)
(52) U.S. Cl. .................................. 244/158.4
(58) Field of Classification Search ............ 244/158 R; 455/13.2
See application file for complete search history.

(56) References Cited

U.S. PATENT DOCUMENTS

| | | | |
|---|---|---|---|
| 3,813,067 A | 5/1974 | Mork | |
| 4,062,509 A | 12/1977 | Muhlfelder et al. | |
| 4,071,211 A | 1/1978 | Muhlfelder et al. | |
| 4,219,940 A | 9/1980 | Okubo | |
| 4,375,697 A * | 3/1983 | Visher | 455/13.1 |
| 4,537,375 A | 8/1985 | Chan | |
| 4,654,846 A | 3/1987 | Goodwin et al. | |
| 4,754,280 A | 6/1988 | Brown et al. | |
| 4,767,084 A | 8/1988 | Chan et al. | |
| 4,890,284 A | 12/1989 | Murphy et al. | |
| 4,943,808 A * | 7/1990 | Dulck et al. | 342/356 |
| 5,025,381 A | 6/1991 | Goodzeit et al. | |
| 5,058,835 A | 10/1991 | Goodzeit et al. | |
| 5,062,051 A | 10/1991 | Sainct et al. | |
| 5,080,307 A | 1/1992 | Smay et al. | |
| 5,092,543 A | 3/1992 | Goodzeit | |
| 5,100,084 A | 3/1992 | Rahn et al. | |
| 5,123,617 A | 6/1992 | Linder et al. | |
| 5,139,218 A | 8/1992 | Bird et al. | |
| 5,201,833 A | 4/1993 | Goodzeit et al. | |
| 5,205,518 A | 4/1993 | Stetson, Jr. | |
| 5,248,118 A | 9/1993 | Cohen et al. | |
| 5,263,666 A * | 11/1993 | Hubert et al. | 244/172 |
| 5,277,385 A | 1/1994 | Flament | |
| 5,284,309 A | 2/1994 | Salvatore et al. | |
| 5,307,206 A | 4/1994 | Haessig, Jr. | |
| 5,308,024 A | 5/1994 | Stetson, Jr. | |
| 5,335,179 A | 8/1994 | Boka et al. | |
| 5,343,398 A | 8/1994 | Goodzeit et al. | |
| 5,349,532 A | 9/1994 | Tilley et al. | |
| 5,354,016 A | 10/1994 | Goodzeit et al. | |
| 5,400,252 A | 3/1995 | Kazimi et al. | |
| 5,412,574 A | 5/1995 | Bender et al. | |
| 5,424,872 A | 6/1995 | Lecuyer et al. | |
| 5,433,402 A | 7/1995 | Surauer et al. | |
| 5,452,869 A | 9/1995 | Basuthakur et al. | |
| 5,458,300 A | 10/1995 | Flament et al. | |
| 5,546,309 A | 8/1996 | Johnson et al. | |
| 5,556,058 A | 9/1996 | Bender | |
| 5,562,266 A | 10/1996 | Achkar et al. | |
| 5,597,142 A | 1/1997 | Leung et al. | |
| 5,608,634 A | 3/1997 | Goodzeit et al. | |
| 5,610,820 A | 3/1997 | Shankar et al. | |
| 5,646,847 A | 7/1997 | Ratan et al. | |
| 5,654,549 A | 8/1997 | Landecker et al. | |
| 5,687,933 A | 11/1997 | Goodzeit et al. | |
| 5,692,707 A | 12/1997 | Smay | |
| 5,738,309 A | 4/1998 | Fowell | |
| 5,745,869 A | 4/1998 | van Bezooijen | |
| 5,749,545 A | 5/1998 | Gnatjuk | |
| 5,765,780 A | 6/1998 | Barskey et al. | |
| 5,799,904 A | 9/1998 | Goodzeit et al. | |
| 5,806,804 A | 9/1998 | Goodzeit et al. | |
| 5,813,633 A | 9/1998 | Anzel | |
| 5,813,634 A * | 9/1998 | Pizzicaroli et al. | 244/176 |
| 5,845,880 A | 12/1998 | Petrosov et al. | |
| 5,931,421 A | 8/1999 | Surauer et al. | |
| 5,984,236 A | 11/1999 | Keitel et al. | |

(Continued)

FOREIGN PATENT DOCUMENTS

| | | |
|---|---|---|
| EP | 0499815 | 8/1992 |
| EP | 0568209 | 11/1993 |
| EP | 0604214 | 6/1994 |
| EP | 0780298 | 6/1997 |
| EP | 0922635 | 6/1999 |
| EP | 0937644 | 8/1999 |
| EP | 1024082 | 8/2000 |
| JP | 321597 | 1/1991 |

OTHER PUBLICATIONS

Voss, L., "New Thrust for U.S. Satellites", Aerospace America, American Institute of Aeronautics & Astronautics, New York, vol. 38, No. 2, Feb. 2000, pp. 36-40.

(Continued)

*Primary Examiner*—Robert P. Swiatek
(74) *Attorney, Agent, or Firm*—McDermott Will & Emery LLP

(57) ABSTRACT

A sparing system for space vehicle constellations. A plurality of space vehicles arranged in at least one mission orbit plane. The number of space vehicles is at least one greater than a minimum number necessary to provide at least a minimum level of service necessary to carry out a constellation mission. If one of the space vehicles fails the remaining space vehicles are repositioned in the mission orbit plane to provide the minimum level of service necessary to carry out a constellation mission.

14 Claims, 2 Drawing Sheets

U.S. PATENT DOCUMENTS

| | | | |
|---|---|---|---|
| 5,984,237 A | 11/1999 | Goodzeit | |
| 5,996,941 A | 12/1999 | Surauer et al. | |
| 6,026,337 A | 2/2000 | Krigbaum et al. | |
| 6,032,904 A | 3/2000 | Hosick et al. | |
| 6,039,290 A | 3/2000 | Wie et al. | |
| 6,047,927 A | 4/2000 | Heiberg et al. | |
| 6,050,525 A * | 4/2000 | Drake | 244/158 R |
| 6,089,507 A | 7/2000 | Parvez et al. | |
| 6,102,337 A | 8/2000 | Quartararo | |
| 6,108,594 A | 8/2000 | Didinsky et al. | |
| 6,116,543 A | 9/2000 | Koppel | |
| 6,131,858 A * | 10/2000 | Dethienne et al. | 244/172 |
| 6,145,790 A | 11/2000 | Didinsky et al. | |
| 6,186,446 B1 * | 2/2001 | Tilley et al. | 244/158 R |
| 6,213,432 B1 | 4/2001 | Koppel | |
| 6,260,805 B1 | 7/2001 | Yocum, Jr. et al. | |
| 6,282,467 B1 | 8/2001 | Shah et al. | |
| 6,285,927 B1 | 9/2001 | Li et al. | |
| 6,285,928 B1 | 9/2001 | Tilley et al. | |
| 6,292,722 B1 | 9/2001 | Holmes et al. | |
| 6,296,207 B1 | 10/2001 | Tilley et al. | |
| 6,314,344 B1 | 11/2001 | Sauer et al. | |
| 6,327,523 B1 | 12/2001 | Cellier | |
| 6,336,062 B1 | 1/2002 | Yamashita | |
| 6,356,815 B1 | 3/2002 | Wu et al. | |
| 6,381,520 B1 | 4/2002 | Highham et al. | |
| 6,389,336 B1 | 5/2002 | Cellier | |
| 6,442,385 B1 | 8/2002 | Marko | |
| 6,470,243 B1 | 10/2002 | Eyerly et al. | |
| 6,481,672 B1 | 11/2002 | Goodzeit et al. | |
| 6,502,790 B1 * | 1/2003 | Murphy | 244/158 R |
| 2002/0119750 A1 | 8/2002 | Youssefi | |

OTHER PUBLICATIONS

"Electric Propulsion", Aerospace America, American Institute of Aeronautics & Astronautics, New York, vol. 30, No. 12, Dec. 1, 1992, p. 42.

Anzel, B., "Stationkeeping the Hughes HS 702 Satellite with a Xenon Ion Propulsion System," Congress of the International Astronautical Federation, Sep. 28, 1998.

* cited by examiner

EFFICIENT ORBIT SPARING SYSTEM FOR SPACE VEHICLE CONSTELLATIONS

CROSS-REFERENCES TO RELATED APPLICATIONS

This application claims the benefit of Provisional Patent Application Ser. No. 60/359,308 filed on Feb. 26, 2002 the full disclosure of which is incorporated herein by reference for all purposes.

BACKGROUND OF THE INVENTION

The present invention relates to an arrangement of space vehicles in a constellation, wherein all spacecraft in the constellation operate to provide at least a minimum level of service. Additionally, at least one of the space vehicles in the constellation can act as a spare in the event of failure of any of the space vehicles in the constellation. The sparing arrangement is such that a minimum level of service is efficiently restored in the event of a spacecraft failure. The present invention also relates to a method for arranging space vehicles in a constellation and for replacing a failed space vehicle in a constellation.

A common approach for providing global communications coverage is to use multiple space vehicles (SVs) equally spaced in several inclined orbit planes. For example, one proposed constellation uses a Walker constellation arrangement that includes two inclined orbit planes, with 6 SVs in each plane (12 SVs total), and with the SV orbit ascending nodes separated by 180 degrees. Practical constellations include in-orbit spares to provide redundancy in the event that an operational SV fails. Typically, one or two non-operational spares per orbit plane are provided. The spares are stored in so called "sparing" orbits that have a different altitude and inclination from the mission orbit but precess at the same rate. If an SV in the constellation fails, a spare SV is transferred from the sparing orbit to the mission orbit to replace the failed SV. This approach is currently used for the Iridium, Globalstar, and the Intermediate Circular Orbit constellations.

One drawback of the prior-art sparing approach is that the spare SVs cannot be used to provide service. In effect, the spare SV resources, which may represent about 10 to 20% of the constellation, serve no useful benefit unless another SV fails. Additionally, the spare unused SVs degrade due to radiation exposure in the space environment, whether they are used or not, and ultimately become useless. Another drawback of the known sparing approach described above is that a failed SV cannot be rapidly replaced without a large fuel penalty. For example, for the proposed Walker constellation discussed above, for a failed SV replacement time of about 4 days and using a prior-art sparing approach, over 230 kg of propellant is required. This assumes a Delta-V of about 600 meters/second and a spacecraft dry mass of approximately 840 kg. The worst-case 360 degree phase change necessary for SV replacement may be accomplished within about 4 days starting from a sparing orbit with a drift rate of about 90 degree/day relative to the mission orbit. Unfortunately, accommodating this large amount of propellant increases the SV size and mass, increasing the number of launch vehicles needed to populate the constellation, and increasing the launch cost.

BRIEF SUMMARY OF THE INVENTION

The present invention provides a sparing system for space vehicle constellations. The system includes a plurality of space vehicles in at least one mission orbit plane. The number of space vehicles is at least one greater than a minimum number necessary to provide at least a minimum level of service necessary to carry out a constellation mission. If one of the space vehicles fails the remaining space vehicles are repositioned in the mission orbit plane to provide the minimum level of service necessary to carry out the constellation mission.

The present invention also provides a sparing system for space vehicle constellations. The system includes a plurality of primary space vehicles in at least one mission orbit plane. The number of primary space vehicles is a minimum number necessary to provide at least a minimum level of service necessary to carry out a constellation mission. At least one spare operational space vehicle is in the mission orbit plane. If one of the primary space vehicles fails the at least one spare space vehicle is repositioned in the mission orbit plane to provide the minimum level of service necessary to carry out the constellation mission.

Furthermore, the present invention provides a method for arranging space vehicles in a constellation. A plurality of space vehicles are arranged in at least one mission orbit plane. The number of space vehicles is at least one greater than a minimum number necessary to provide at least a minimum level of service necessary to carry out a constellation mission. If one of the space vehicles fails, the remaining space vehicles are repositioned in the mission orbit plane to provide the minimum level of service necessary to carry out a constellation mission.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
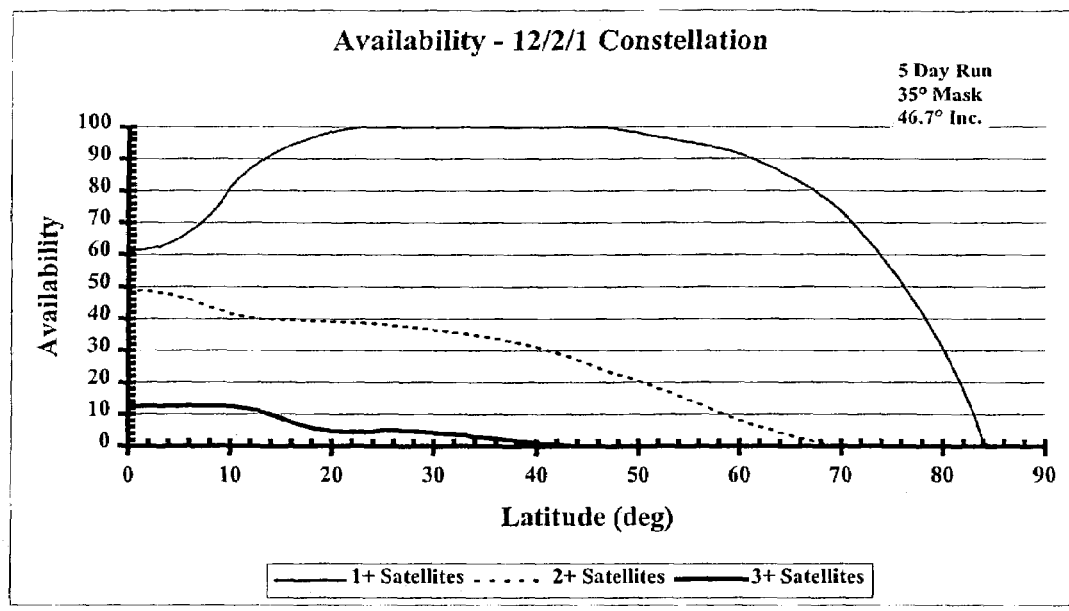
FIG. 1 is a graph that illustrates the relationship between satellite availability and earth latitude in a constellation that includes six satellites in each of two orbit planes.

The present invention overcomes drawbacks of typically utilized sparing system by providing systems and methods in which all space vehicles, including redundant or spare ones, are maintained in the mission orbit, and all SVs provide communications service. Also, since all space vehicles are in the mission orbit, they can all continue to operate and provide communications service during a re-phasing period. Therefore, there are no wasted or underused space-based assets. Secondly, if an SV fails, the propellant required to re-phase the impacted plane is small and accommodating it on-board the SV does not significantly impact the SV design. As a result, the present invention reduces the cost of the SV and the associated constellation. Also, the performance of the constellation when all spacecraft are operating in general is better than the performance for a minimum constellation with non-operational spares. Therefore, a performance benefit is achieved compared to a prior-art constellation, until at least the time an SV failure actually occurs. In the event of an SV failure, a re-phasing is performed to adjust the relative locations of the SVs within the impacted plane. The SVs continue to operate to provide service during this re-phasing period. Because the earth coverage properties of the re-phased constellation improve as the SVs reach their final destination, the service impact of a failure is reduced compared to a prior-art sparing system, where the high drift rates preclude the resumption of full-service operation until the spare SV transfer from the sparing to the operational orbit is completed.

In other words, according to one embodiment of the present invention, if one space vehicle in a mission orbit fails, a replacement does not need to be moved from a sparing orbit, with a different period or inclination, to replace the failed space vehicle to maintain the minimum level of service. Of course, after one or more failures, another space vehicle may need to be launched to supplement the constellation and provide a replacement spare. However, prior to any failures, the present invention does not require additional launches or moving space vehicles from sparing orbits. In other words, the present invention is an improved system and method for constellation sparing that maximizes the use of all constellation SV assets and reduces the propellant required to replace a failed SV within a given allotted replacement time.

In accordance with one embodiment, the present invention provides a sparing system that includes a constellation with a plurality of space vehicles in one or more mission orbit planes. The number of space vehicles is at least one greater than a minimum number of space vehicles necessary to provide at least a minimum level of service necessary to carry out the mission of the constellation.

Alternatively, the constellation could be considered to include a plurality of primary space vehicles in at least one mission orbit plane. The number of primary space vehicles is equal to the minimum number of space vehicles necessary to provide at least a minimum level of service necessary to carry out the mission of the constellation. This arrangement also includes at least one spare operational space vehicle in each of the at least one mission orbit planes. Of course, more than one spare may be arranged in each orbit plane.

In both of the above cases, the space vehicles typically are arranged within each orbit plane with equal or nearly equal angular separation. However, any arrangement necessary to fulfill any mission may be employed. One particular embodiment employs a Walker constellation arrangement. After failure of an SV and repositioning of the remaining SVs, the remaining space vehicles typically are equally spaced within each mission orbit plane.

Regardless of how the arrangement of the space vehicles is described, in each orbital plane there are more SVs than the minimum number necessary to provide a minimum level of service necessary to carry out the mission of the constellation. If one of the space vehicles fails, at least a portion of the remaining space vehicles are repositioned or re-phased to provide the minimum level of service necessary to carry out the mission of the constellation. Significantly, at no time before the failure or after the repositioning is the mission interrupted, unless more than one failure has occurred and the number of space vehicles is not sufficient to address the number of multiple failures.

The number of space vehicles in each orbit plane depends at least in part upon the mission and the desired level of redundancy. According to one embodiment that provides near-global coverage, the minimum number of space vehicles required to provide at least a minimum level of service of the constellation mission is 6 in each of two mission orbit planes. Each plane has the same inclination, but with ascending node right ascensions that are separated by about 180 degrees. Seven operational space vehicles are equally spaced in each of these orbit planes, one more in each plane than the minimum number needed to provide the minimum level of service. According to another embodiment, the number of space vehicles required to provide at least a minimum level of service of the constellation mission is 6 in each of three mission orbit planes, where the equally inclined orbit planes are spaced about 120 degrees apart in right ascension. According to this embodiment, seven operational space vehicles are arranged in each of these orbit planes, one more in each plane than the minimum number needed to provide the minimum level of service.

As one skilled in the art will appreciate, if more than one spare space vehicle is arranged in an orbit plane or the number of space vehicles is more than one greater than a minimum number necessary to provide at least a minimum level of service necessary to carry out a constellation mission, then the system can accommodate multiple space vehicle failures.

The space vehicles in the constellation may be arranged in any desired orbit configuration. Those of ordinary skill in the art would be able to determine an arrangement of space vehicles necessary to carry out any desired mission without undue experimentation.

The following describes a specific illustrative example of the present invention. Other arrangements of space vehicles are possible. This example is not exhaustive of all of such arrangements.

According to this example, the constellation includes two orbital planes that are inclined about 47 degrees relative to the equator. Each orbit in this example is circular and with an altitude of about 10,930 km, resulting in an orbit period of approximately 6.3 hours. The ascending nodes of the space vehicles in one of the orbit planes are rotated about 180 degrees with respect to those in the other orbit plane. To provide at least the minimum level of service, six space vehicles are arranged in each orbital plane. The space vehicles are equally spaced approximately every 60 degrees within each orbital plane. Additionally, according to this example, to provide at least the minimum level of service, the space vehicles are arranged in each orbital plane such that space vehicles arrive at the ascending node of each orbit plane with a separation of about 30 degrees or about $1/12$th of an orbit period. The arrangement results in an SV angular separation at the equator crossing (ascending node of one plane and descending node of the other plane) also of 30 degrees. A variant of this constellation includes three planes of 6 SVs each, with the orbit planes rotated about 120 degrees in right ascension relative to one another. The invention is applicable to this alternative constellation configuration as well.

In applying the present invention to this example, the constellation described above is implemented with at least seven space vehicles in each of the orbital planes. In other words, to implement a sparing system according to the present invention, the number of SVs in each plane is increased by at least one. According to this example, if seven space vehicles are arranged in each orbital plane, the SVs are uniformly spaced about 51.4 degrees apart. The inter-plane phasing of the SVs is such that when one SV in a plane is at the ascending node, an SV in the other plane is also at its ascending node. Furthermore, prior to failure of a space vehicle in either of the two orbital planes, a minimum angular spacing between space vehicles crossing the equator is about 25.7 degrees or about 1/14th of an orbit period. In each plane, all SVs operate and provide the service that would normally be provided using a prior-art sparing system with six SVs in each plane and two non-operational spares maintained in sparing orbits. With a system according to the invention, in the event of an SV failure in one plane, the SVs in the impacted plane continue to provide service as their relative orbital positions are adjusted or rephased. When the re-phasing is complete, seven SVs will be operating in the plane without the failure and six SVs will be operating in the plane that has experienced the failure. Once the rephasing is complete, the constellation is capable of providing at least the minimum level of service. For the re-phased configuration, when an SV in the plane of six is at the ascending node, an SV in the plane of seven is about 12.9 degrees from its ascending node. With this arrangement, the minimum angular separation between SVs at the equator crossing is also about 12.9 degrees or about 1/28th of an orbit period.

Figure 2:
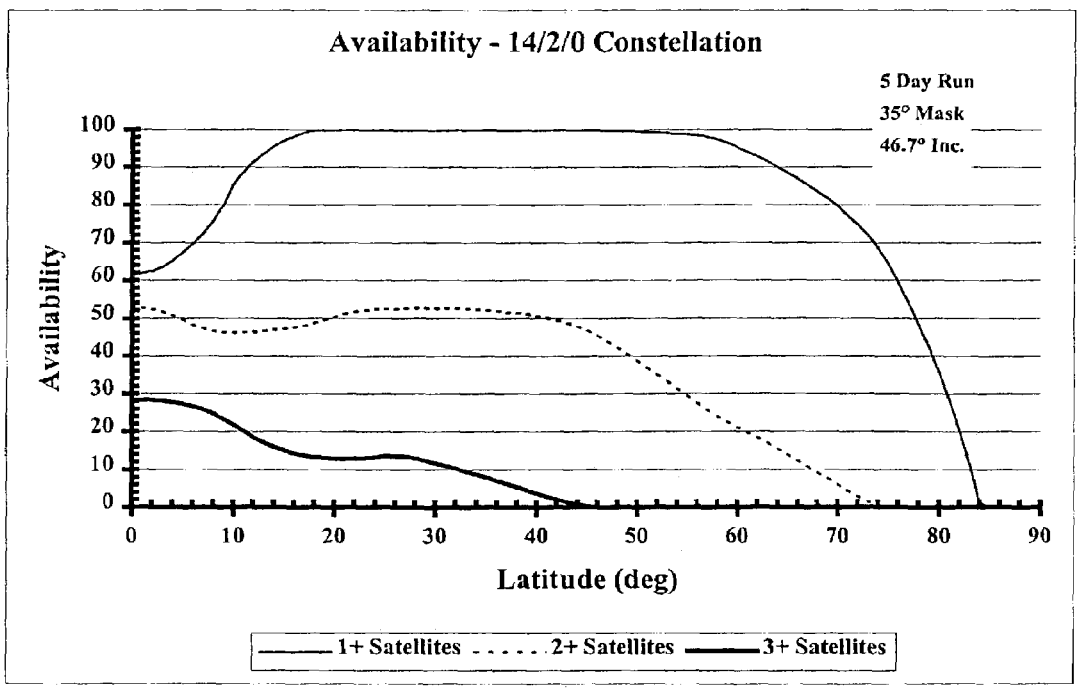
FIG. 2 is a graph that illustrates the relationship between satellite availability and earth latitude in a constellation that includes seven satellites in each of two orbit planes.

FIG. 1 shows the elevation angle coverage, which represents the view angle to the SV as measured from the local horizon, for the constellation with six SVs per plane, referred to herein as a 6/6 configuration. The elevation angle is shown as a function of the latitude of an observer on the surface of the Earth, and is considered to be independent of the longitude of the observer. FIG. 2 shows coverage with seven SVs per plane, referred to herein as a 7/7 configuration. As expected, the 7/7 configuration provides improved elevation angle coverage as compared to the 6/6 configuration. This can also be seen from Table 1, which gives the latitude range for 35 degree elevation coverage by at least one SV for the full and reduced constellation configurations (7/7, 7/6, 6/7, and 6/6). Using the spare SVs to provide service improves performance by extending the 35 degree coverage lower latitude from about 24 to about 19 degrees.

Table 1 also gives the inter-plane phasing for each configuration. The 7/7 configuration is setup so that when one SV is at its ascending node, an SV in the other plane is also at its ascending node. With this arrangement, the minimum angular spacing between SVs crossing the equator is about 25.7 degrees. For the 6/6 configuration, the inter-plane phasing is such that the SVs cross the equator with about 30 degrees of separation.

TABLE 1

| Constellation Configuration | Active SVs in Plane 1 | Active SVs in Plane 2 | Inter-plane separation at equator (deg) | Latitude range for 35° elevation |
|---|---|---|---|---|
| Nominal | 7 | 7 | 25.7 | 19 to 45 |
| Reduced 1 | 6 | 7 | 12.9 | 24 to 41 |

TABLE 1-continued

| Constellation Configuration | Active SVs in Plane 1 | Active SVs in Plane 2 | Inter-plane separation at equator (deg) | Latitude range for 35° elevation |
|---|---|---|---|---|
| Reduced 2 | 7 | 6 | 12.9 | 24 to 41 |
| Base | 6 | 6 | 30 | 24 to 45 |

Starting from the 7/7 configuration, if an SV fails, a coverage gap appears between the SVs that neighbor the failed SV. The gap must be closed as quickly as possible to minimize the disruption in communications service. Additionally, the phasing of the other SVs in the plane must be adjusted so that they are all uniformly spaced and have the correct overall inter-plane phasing relationship relative to the other plane.

According to this example, the re-phasing strategy is based on a starting and stopping maneuver sequence with a time limit of 4 days to complete the re-phasing. In re-phasing, the in-track angular separation of about 51.4 degrees for 7 SVs has to be changed to about 60 degrees for the 6 remaining non-failed or good SVs. Also, the minimum inter-plane phase angle has to be changed to about 12.9 degrees to avoid too much coverage overlap and collision risk at either the ascending or descending nodes.

The ideal re-phasing Delta-V for the two SVs that border the failed SV is about 21.2 m/s and is made up of three burns for starting the in-track drift, stopping the in-track drift, and correcting the orbit right ascension. A drift rate of about 5.35 deg/day is established with the first burn, which is removed by the second burn when the SV reaches its correct position. A similar strategy is used for re-phasing the other SVs, but the required drift rates and Delta-Vs are smaller. Superimposed on these drift rates that are necessary to close the coverage gap, a further small drift rate is established for all SVs of the impacted plane to achieve the required inter-plane phasing relationship.

Figure 3:
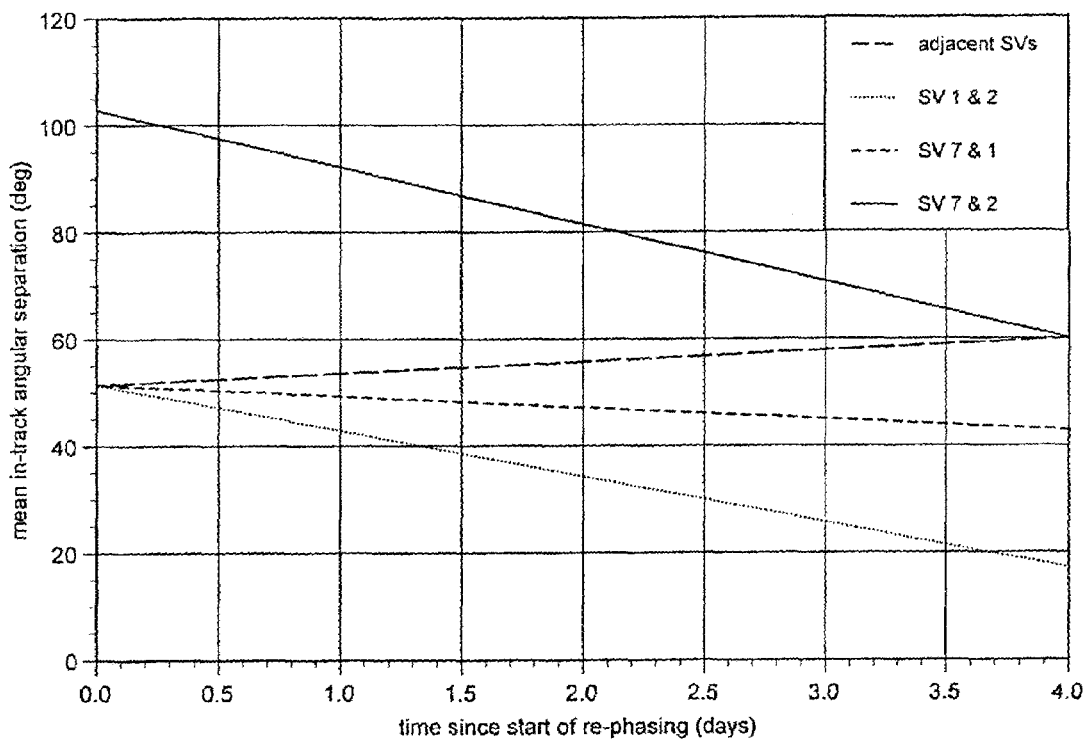
FIG. 3 is a graph that illustrates the relationship between spacecraft mean in-track separation and time since the beginning of orbit plane re-phasing according to an embodiment of the present invention.

FIG. 3 illustrates re-phasing performance. SVs 7 and 2 are adjacent to failed SV 1, and the gap between them reduces from about 102.8 degrees to about 60 degrees in about 4 days, as shown by the top line on the graph. The angular separation between all active SV pairs, shown by the curve next to the top, increases from about 51.4 to about 60 degrees over the same period.

According to this example, each SV has a mass of about 842 kg. The propellant required to execute the re-phasing, using 0.2 lbf mono-propellant REAs, is approximately 11 kg. This small amount of propellant can easily be accommodated within the nominal SV tankage, without impacting the SV design. Significantly, this is about twenty-one times less propellant than would typically be required utilizing know sparing approaches.

Alternatively, to keep a spare SV in a drift orbit such that it could replace a failed SV within 4 days would be impractical from a Delta-V and propellant requirement standpoint. The drift orbit for the spare SV would have to be at 10,212 km altitude for a synodic period of 4 days and would have an inclination of 53.75° so it could precess at the same rate as the operational orbit. The Delta-V required to transfer is 602.9 m/s and the propellant required is 235 kg. Also, LAE thrust level engines, for example, engines producing on the order of about 100 pounds of thrust, would be required to perform the transfer with just two burns.

Figure 4:
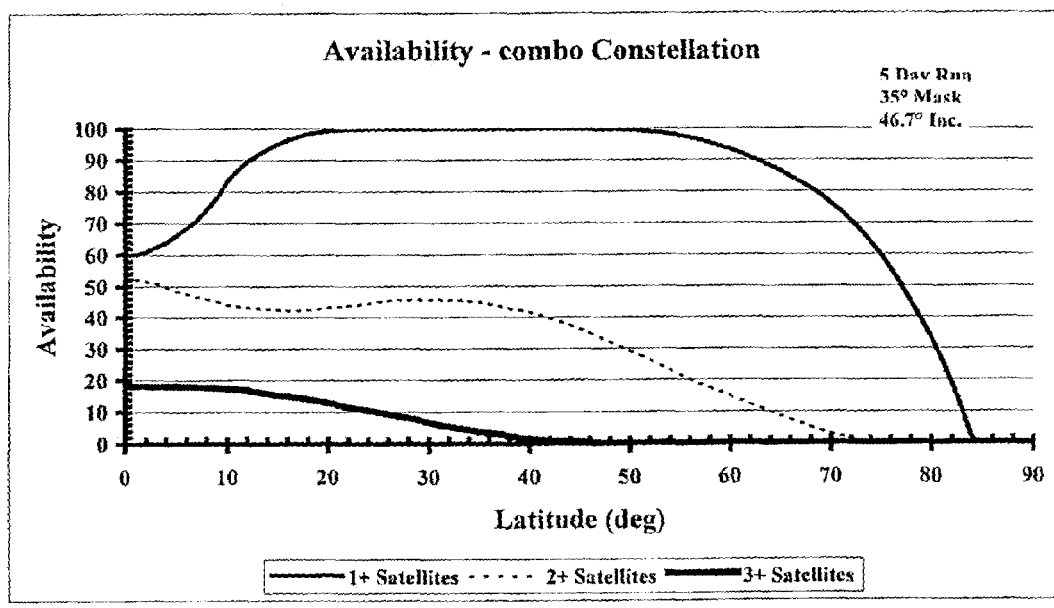
FIG. 4 is a graph that illustrates the relationship between satellite availability and earth latitude for a reconfigured constellation according to the present invention.

FIG. 4 shows the elevation coverage for the 7/6 (or 6/7) configurations following the failure of one space vehicle in one orbital plane and the subsequent re-phasing. Table 1 shows that the cost of the using the invention is a slight reduction in elevation performance compared to the base 6/6 configuration. In this case, the upper bound latitude for 35 degree elevation angle coverage drops from 45 to 41 degrees. This occurs because the 7/6 SV phasing is sub-optimal compared to the Walker 6/6 constellation arrangement. Additional analysis shows however that full coverage is retained if the elevation requirement is reduced slightly from 35 to 34 degrees. Hence, operating with the reduced configurations (7/6 or 6/7) should have a negligible impact on the quality of service.

If an SV fails in the remaining 7 SV plane, a similar re-phasing strategy is executed to transition the constellation to the base 6/6 configuration. As before, this re-phasing can be accomplished in 4 days with a maximum fuel use of roughly 11 kg for the two SVs adjacent to the failed SV, and less for the other SVs in the impacted plane.

The present invention also includes a method for arranging space vehicles in a constellation. According to the method, a plurality of space vehicles are arranged in at least one mission orbit plane. The number of space vehicles in the at least one mission orbit plane is at least one greater than a minimum number necessary to provide at least a minimum level of service necessary to carry out a constellation mission. Upon failure of one of the space vehicles, the remaining space vehicles are repositioned in the mission orbit plane to provide the minimum level of service necessary to carry out a constellation mission.

In conclusion, the present invention provides novel systems and methods for implementing a space vehicle constellation and sparing system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for arranging space vehicles in a constellation, the method comprising:
   arranging a plurality of operational space vehicles in at least one mission orbit plane, each operational space vehicle being in an active state in coordinated support of a constellation mission, the number of operational space vehicles being at least one greater than a minimum number necessary to provide at least a minimum level of service necessary to carry out the constellation mission; and
   repositioning, upon failure of one of the space vehicles, each of the remaining operational space vehicles in the mission orbit plane to provide the minimum level of service necessary to carry out the constellation mission.

2. The method according to claim 1, wherein the step of arranging a plurality of operational space vehicles comprises arranging at least a portion of the operational space vehicles so that they are unequally spaced apart from each other in the at least one mission orbit plane.

3. The method according to claim 1, wherein the step of arranging a plurality of operational space vehicles comprises arranging at least a portion of the operational space vehicles so that they are equally spaced apart from each other in the at least one mission orbit plane.

4. The method according to claim 1, wherein after the step of repositioning remaining operational space vehicles, the remaining operational space vehicles are arranged equally spaced apart from each other in the at least one mission orbit plane.

5. The method according to claim 1, wherein the step of arranging a plurality of operational space vehicles comprises arranging the plurality of operational space vehicles into a Walker constellation arrangement.

6. The method according to claim 1, wherein the step of arranging a plurality of operational space vehicles comprises arranging seven operational space vehicles in each of two orbit planes prior to the failure of any space vehicles.

7. The method according to claim 6, wherein the two mission orbit planes are inclined about 47 degrees relative to the Earth's equator.

8. The method according to claim 6, wherein each orbit is circular with an altitude of about 10,930 km.

9. The method according to claim 6, wherein the ascending nodes of the plurality of operational space vehicle orbits in each of the two mission orbit planes are rotated 180 degrees with respect to each other.

10. The method according to claim 6, wherein the step of arranging a plurality of operational space vehicles comprises arranging the plurality of operational space vehicles in each of the two mission orbit planes such that operational space vehicles in each plane are at the ascending node at similar times.

11. The method according to claim 6, wherein the step of arranging a plurality of operational space vehicles comprises arranging the plurality of operational space vehicles at a minimum angular spacing of about 25.7 degrees between the plurality of operational space vehicles crossing the equator.

12. The method according to claim 6, wherein the step of repositioning the remaining operational space vehicles comprises repositioning the remaining operational space vehicles at a minimum angular spacing of about 30 degrees between the remaining operational space vehicles crossing the equator.

13. The method according to claim 1, wherein the step of arranging a plurality of operational space vehicles comprises arranging seven operational space vehicles in each of three mission orbit planes prior to the failure of any space vehicles.

14. The method according to claim 1, wherein upon failure of one of the plurality of operational space vehicles, another operational space vehicle does not need to be moved from another orbit, with a different period, inclination, or right ascension, to maintain the minimum level of service.

* * * * *